(12) United States Patent
Kost et al.

(10) Patent No.: US 7,395,651 B2
(45) Date of Patent: Jul. 8, 2008

(54) POINT SUPPORT SYSTEM

(75) Inventors: Troy Allen Kost, LeClaire, IA (US); Michael Wayne Mossman, Silvis, IL (US); Timothy Franklin Christensen, Moline, IL (US); Matthew David Arnold, Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/675,685

(22) Filed: Feb. 16, 2007

(65) Prior Publication Data
US 2007/0193242 A1     Aug. 23, 2007

Related U.S. Application Data

(60) Provisional application No. 60/774,716, filed on Feb. 17, 2006.

(51) Int. Cl.
*A01D 45/02*     (2006.01)
(52) U.S. Cl. ....................................... 56/119
(58) Field of Classification Search ........... 56/119, 56/109, 314, 319, 105, 51
See application file for complete search history.

(56) References Cited

U.S. PATENT DOCUMENTS

| | | | | | |
|---|---|---|---|---|---|
| 3,460,323 | A | * | 8/1969 | Schnaidt | 56/15.7 |
| 4,446,682 | A | * | 5/1984 | Jennen et al. | 56/119 |
| 4,700,537 | A | * | 10/1987 | Emmert | 56/314 |
| 5,195,309 | A | * | 3/1993 | Mossman | 56/119 |
| 5,865,019 | A | * | 2/1999 | Hurlburt et al. | 56/119 |
| 5,910,092 | A | * | 6/1999 | Bennett | 56/119 |
| 6,247,297 | B1 | * | 6/2001 | Becker | 56/119 |
| 6,513,313 | B1 | * | 2/2003 | Bennett | 56/319 |

\* cited by examiner

*Primary Examiner*—Árpád Fábián Kovács

(57) ABSTRACT

The invention comprises a point and cover assembly for a row crop header including a point; a cover coupled to the point with a hinge; a latch fixed to the cover, the latch having a first spring-loaded latch pin for pinning the cover to a first row unit, a second spring loaded latch pin for pinning the cover to a second row unit, and a member coupling the two latch pins together that is operable by one hand to release both latch pins; and a point support fixed to the cover, the point support comprising an elongate member fixed at its rear end to the cover and having an adjustable point rest at its front end for supporting the point at a plurality of different heights.

8 Claims, 7 Drawing Sheets

POINT SUPPORT SYSTEM

This application claims priority of Provisional Application 60/774,716 filed on Feb. 17, 2006, and entitled Point Support System.

FIELD OF THE INVENTION

This invention relates to corn heads for agricultural combines. More particularly, it relates to the gathering points and deck covers for the corn heads. Even more particularly, it relates to structures for supporting the point in a plurality of different vertical positions.

BACKGROUND OF THE INVENTION

With current corn heads the gathering points must be jack-knifed or manually locked for transport and service. This is a time consuming process especially with large heads. This arrangement for supporting the points and covers restricts access to the row unit and hinders cleanout.

Most of these machines have cumbersome hardware to hold down the deck cover. They cannot be quickly opened or closed for cleanout or repair. The machines that do offer quickly engageable latches for points and covers typically have a single latch in the middle of the cover that blocks access to row units.

The system for adjusting the height of a gathering point above the row unit and ground that requires special tools or has loose cumbersome hardware. This makes adjusting the point height a time consuming process.

Furthermore, if two cover release latches are used to secure the deck cover, the farmer must use both hands just to release the cover and has no hands left to lift the cover. This means that two people are required to raise the deck cover and gathering points instead of just one person.

SUMMARY OF THE INVENTION

In accordance with a first aspect of the invention, a point and cover assembly for a row crop header is provided, comprising a point; a cover coupled to the point with a hinge; a latch fixed to the cover, the latch further comprising a first spring-loaded latch pin for pinning the cover to a first row unit, a second spring loaded latch pin for pinning the cover to a second row unit, and a member coupling the two latch pins together that is operable by one hand to release both latch pins from the first and second row units; and a point support comprising an elongate member fixed at its rear end to the cover and having an adjustable point rest at its front end for supporting the point at a plurality of different heights.

2. The adjustable point rest may include a quick coupler operable by one hand to adjust the height of the point. The quick coupler may include a spring loaded pin operable by one hand of the operator to adjust the height of the point. The member may extend laterally and the two latch pins may extend from either end of the member. Each of the two latch pins may be provided with a coil spring to hold each latch pin in a locked position in which the cover is held down. The two latch pins may be configured to engage apertures in two corresponding pin receivers that are fixed to two adjacent row unit control arms. The point and cover assembly may further include an adjustable point rest mounted on the front of the cover. The adjustable point rest may further comprise a fine adjuster for adjusting the position of a first bracket with respect to the elongate member and a spring pin configured to adjust the position of a second bracket with respect to the first bracket, and further wherein the second bracket may have a point support surface for supporting the front of the point in a plurality of vertical positions.

DESCRIPTION OF THE PREFERRED EMBODIMENT

Figure 1:
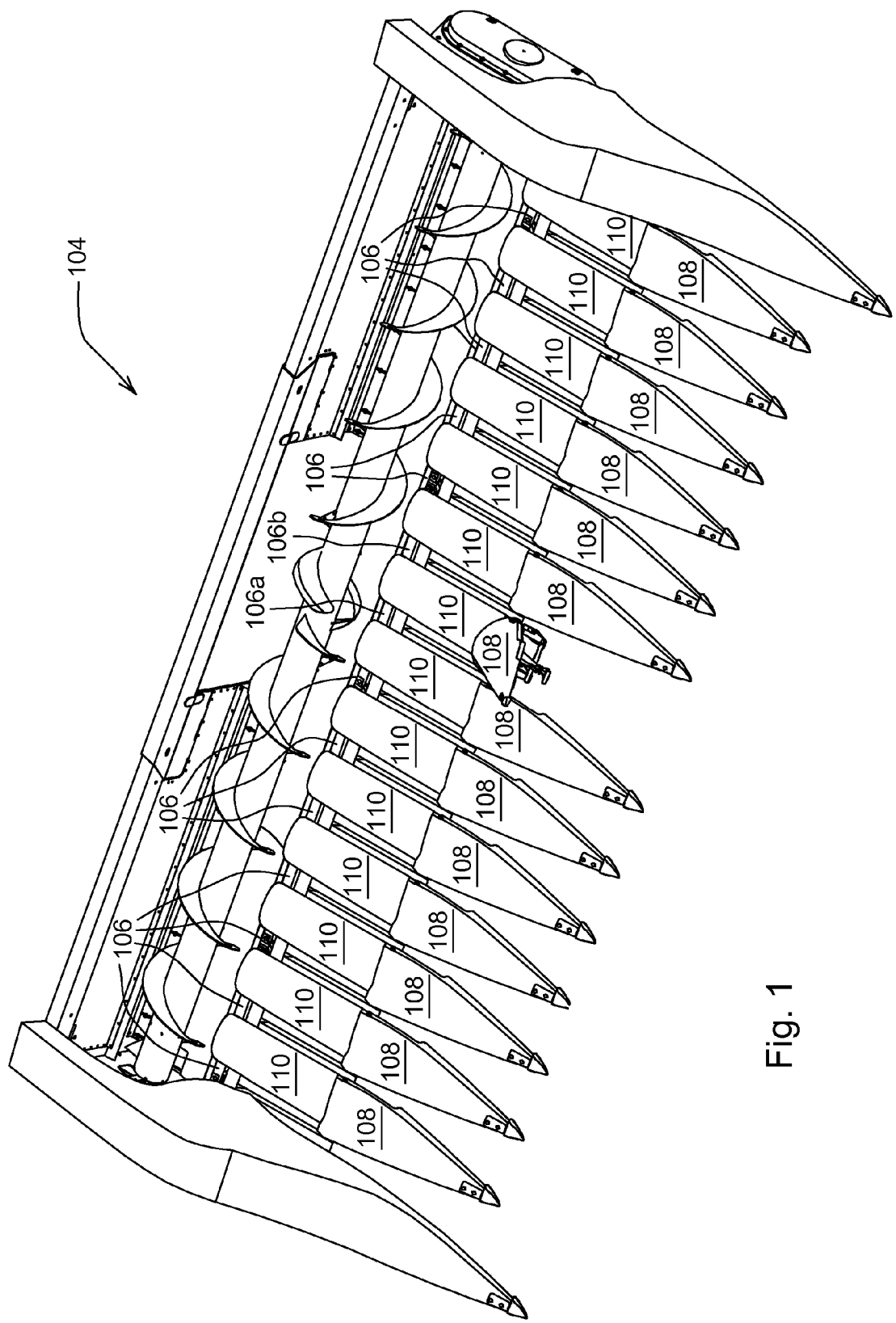
FIG. 1 is a front view of a corn header with a point pivoted upward.

Referring now to FIG. 1, a corn header (or "corn head") 104 for an agricultural combine includes a plurality of row units 106 that are spaced laterally across a leading edge of the corn header. A plurality of points 108 and covers 110 cover the row units to keep them clean and to guide crops into the proper channels for harvesting by each row unit. Each point 108 and corresponding cover 110 covers half of two adjacent row units 106 and the gap between the two adjacent row units. The point direct rows of crops away from the gap between adjacent row units and into the opening in each row unit that is configured to process crops.

Each point 108 is hingeably coupled to its corresponding cover 110 located immediately behind it such that a very forwardmost tip of point 108 can be lifted upward, tilted backwards, and latched in a raised position. One of the points 108 is shown in this raised, latched position in FIG. 1. the other points 108 are identically configured to be raised and latched, but are not shown in their raised position for convenience of illustration.

Figure 2:
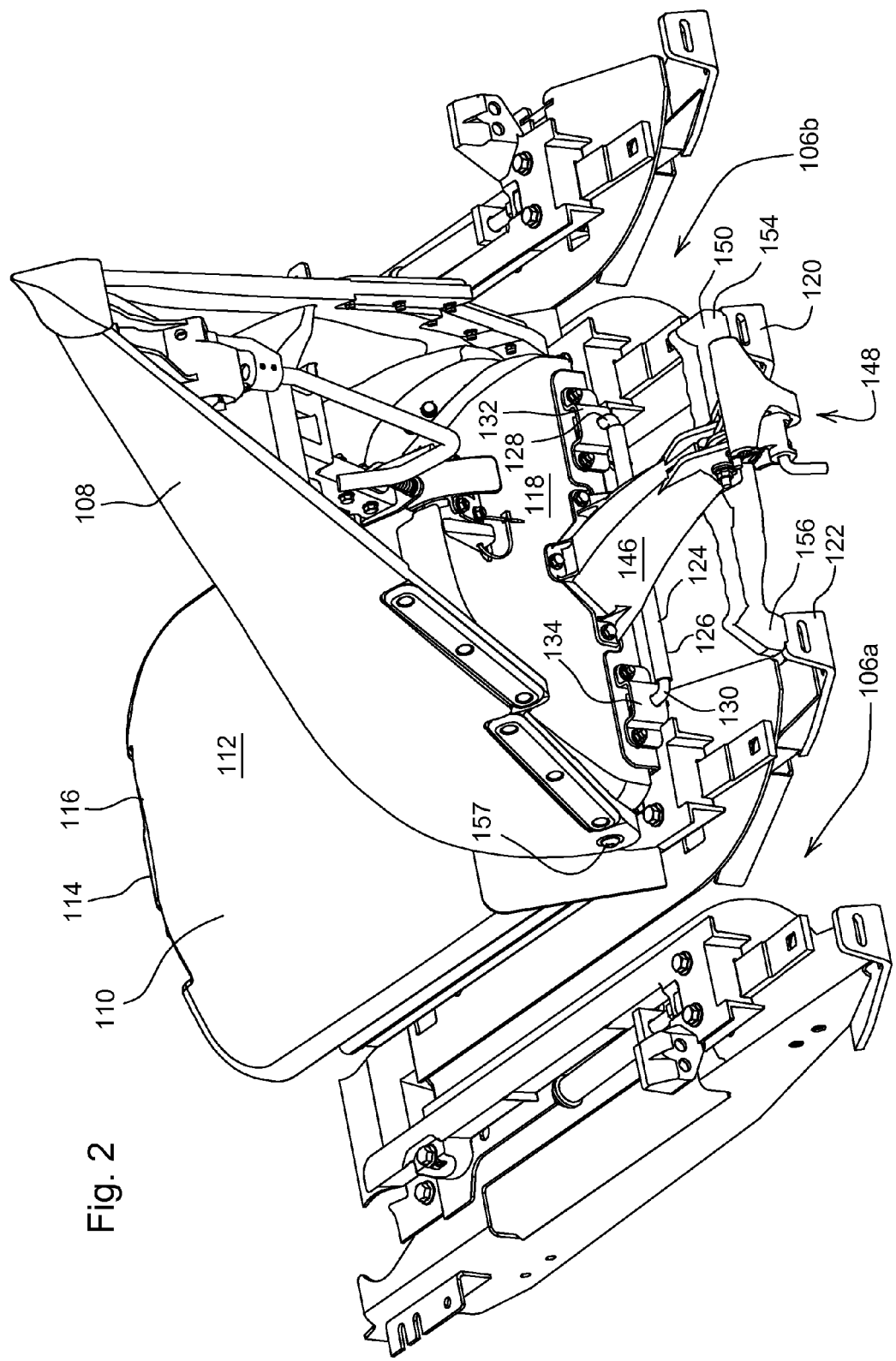
FIG. 2 is a perspective view of two adjacent row units and the pivoted point and cover of FIG. 1.

Referring now to FIG. 2, two adjacent row units 106*a* and 106*b* are shown half-covered by a single point 108 and cover 110. point 108 is shown in its raised and latched position, exposing additional components of the adjacent row units 106*a*, 106*b*, point 108, and cover 110.

Point 108 includes a hollow rotomolded thermoplastic body in the general form of a section of a cone. Cover 110 includes a hollow rotomolded thermoplastic body having an arcuate top surface 112. It is pivotally connected to the frame of header 104 by a hinge 114 along its rear edge 116.

The front edge 118 of cover 110 is held down on row unit arm 120 of row unit 106*b*, and on row unit arm 122 of row unit 106*a* by latch 124.

Latch 124 comprises a laterally extending latch member 126, latch pins 128, 130 that extend from each member 126, latch supports 132, 134 that support and guide latch pins 128, 130, and springs 136, 138 that hold latch pins 128, 130 in a locked position in which cover 110 is held down. In a preferred embodiment, latch member 126 and latch pins 128, 130 are formed of a single metal rod that is bent at both ends to defined pins 128, 130.

Referring now to FIGS. 2, 3, 4 and 6, latch pin 130 is supported in a hole in latch support 134 and latch pin 128 is supported in a hole in latch support 132. Latch supports 132, 134 are fixed to cover 110 and constrain latch pins 128, 130 to move forward and backward with respect to cover 110.

Coil springs 136, 138 extend around latch pins 128, 130 to hold latch pins 128, 130 in their rearward extending, latched and locked positions, which is the position shown in all the Figures herein.

Two pin receivers 140, 142 (FIGS. 3, 6) have holes that receive the free ends of latch pins 128, 130. Pin receivers 140, 142 are fixed to row unit arms 120, 122, respectively. Thus, when latch pins 128, 130 (which are mounted on cover 110) are received in pin receivers 140, 142, they hold the front edge 118 of cover 110 in its downward operating position in which it covers the arms of row units 106a, 106b as shown in all of the Figures herein.

Figure 3:
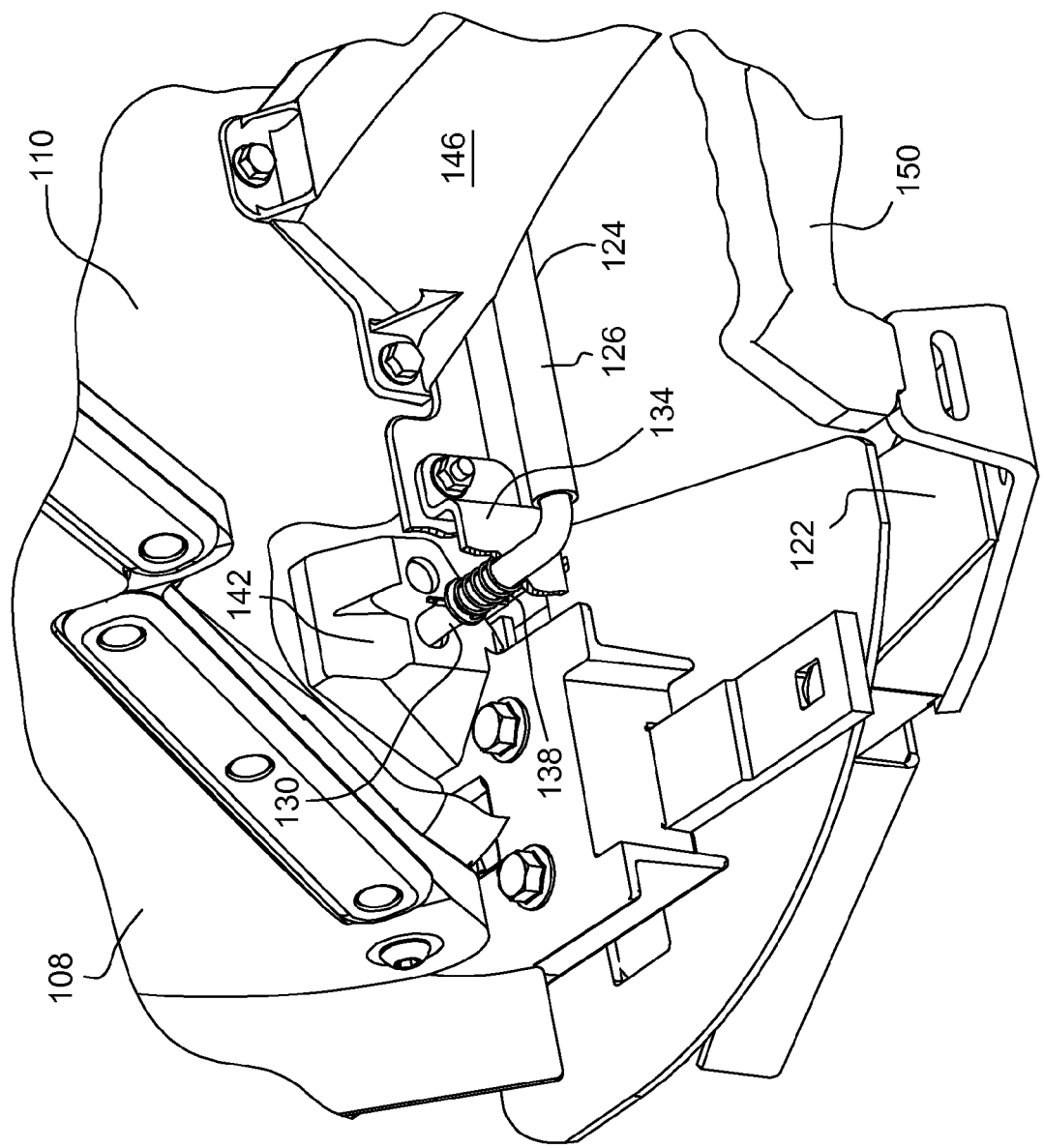
FIG. 3 is a detailed fragmentary view of the latch for holding the cover of FIG. 2 closed.

FIG. 3 is a cutaway view of latch pin 130, coil spring 138, and pin receiver 142 which are disposed on the right side of the cover 110 and row unit arm 122. Latch pin 128 and pin receiver 140 are identically constructed in a mirror image form and are disposed on left side of cover 110.

Figure 4:
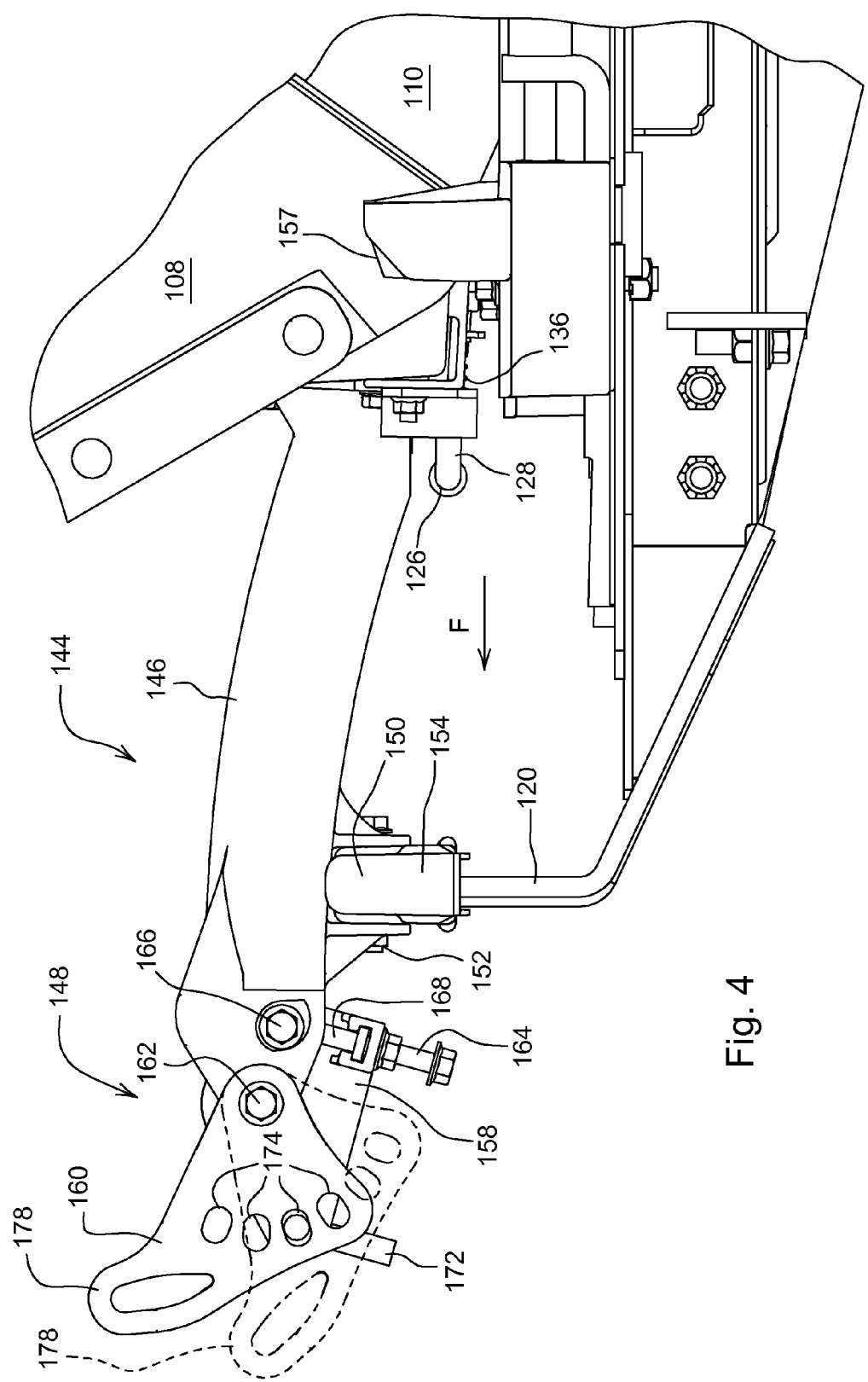
FIG. 4 is a fragmentary left side view of the point, cover, and row units of FIGS. 2-3.

To operate latch 124, the operator grasps member 126 and pulls forward in the direction "F" shown in FIG. 4. latch pins 128, 130 are fixed to member 126 and also pulled forward. As pins 128, 130 pull forward, they compress coil springs 136, 138 and withdraw from pin receivers 140, 142. This action unlatches the front edge 118 of cover 110 from row unit arms 120, 122, permitting the operator to lift front edge 118 upward and to pivot cover 110 about hinge 114 (FIG. 2).

Referring to FIGS. 4-7, cover 110 further comprises a point support 144 which comprises an elongate member 146, an adjustable point rest 148, and a bridge 150. Elongate member 146 is bolted to the middle of the front edge of cover 110 and extends generally forward. A bridge 150 is pivotally coupled to the forward end of elongate member 146 by bolt 152, which extends through elongate member 146 and bridge 150. Bolt 152 permits bridge 150 to pivot slightly with respect to elongate member 146 such that the left and right ends 154, 156 of bridge 150 can move slightly up and down with respect to each other. Left and right ends 154, 156 rest on the forward tips of arms 120, 122. This pivoting permits bridge 150 to accommodate slight misalignments of row unit arms 120, 122 thereby distributing the weight of point 108 equally between them without twisting elongate member 146.

Referring to FIGS. 4, 5, 6, and 7, and adjustable point rest 148 is mounted on the forward end of elongate member 146 and is configured to support the forward end of point 108 and to adjust the height of the point 108 which rests on point support surface 178 of adjustable point rest 148. The rear end of point 108 is pivotally coupled on its left and right sides to cover 110 by hinge 157. Hinge 157 permits the front of cover 108 to be pivoted upward and downward about an axis extending horizontally and laterally through hinge 157.

Figure 5:
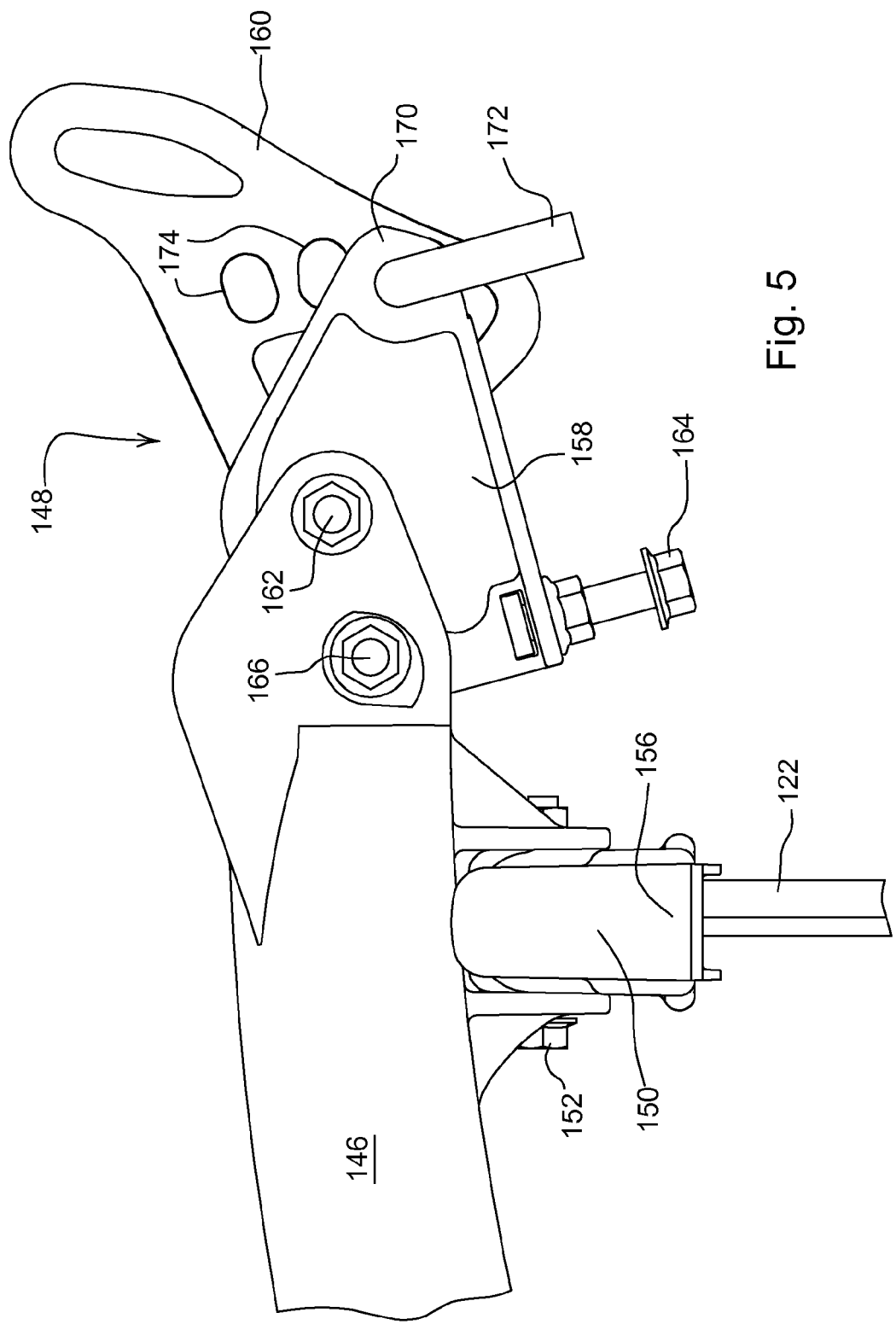
FIG. 5 is a fragmentary right side view of the point, cover, and row units of FIGS. 2-4.
Figure 6:
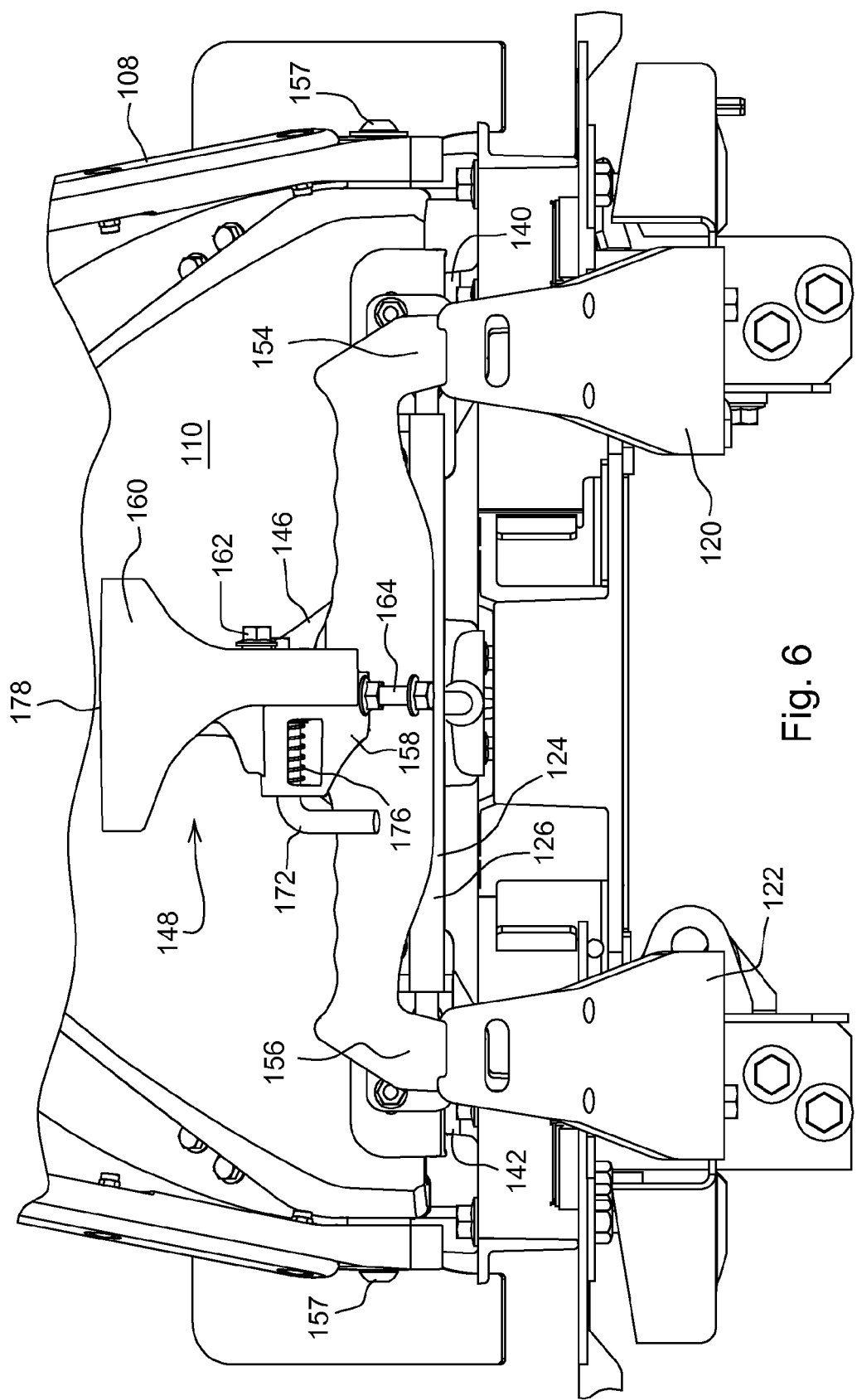
FIG. 6 is a front view of the point, cover, and row units of FIGS. 2-5.
Figure 7:
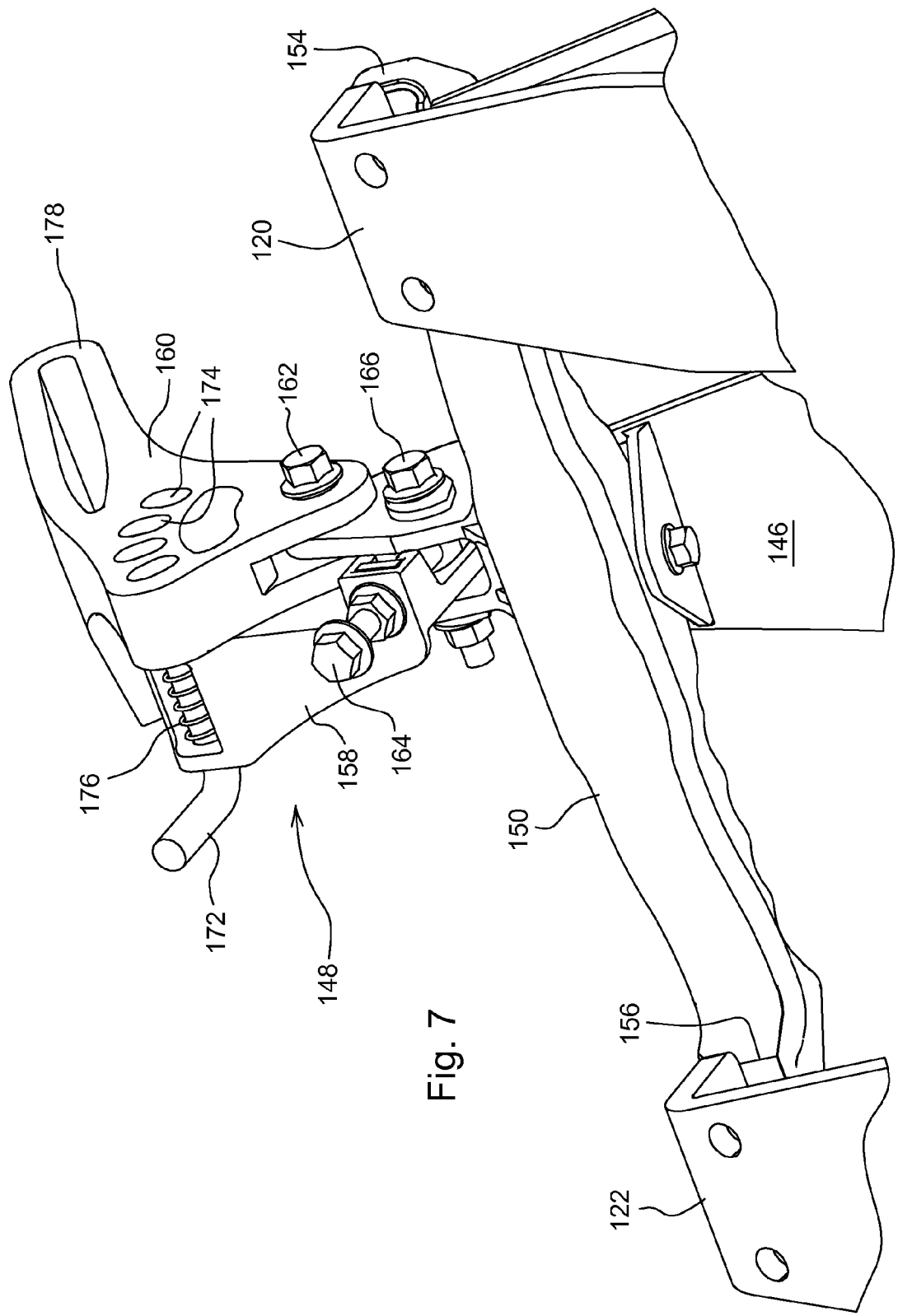
FIG. 7 is a perspective bottom view of the cover and row units of FIGS. 2-6.

Adjustable point rest 148 includes a first bracket 158 that is configured to make fine height adjustments of point 108. Bracket 158 is pivotally coupled to the forward end of elongate member 146 by bolt 162. Referring to FIGS. 4 and 5, a fine adjuster (here shown as bolt 164) is engaged to first bracket 158 to pivot first bracket 158 with respect to elongate member 146 about bolt 162. When the operator rotates fine adjuster 164, free end 168 of fine adjuster 164 abuts elongate member 146 and causes fine bracket 158 to rotate about bolt 162. This changes the height of the forward end 170 (FIG. 5). A quick coupler 172 (here shown as a spring-loaded pin) is supported in forward in 170 of the first bracket 158, and is configured to selectively engage a plurality of holes 174 in second bracket 160. Whenever bolt 164 is rotated, it changes the height of quick coupler 172 in the fine increments of height. Second bracket 160 is pivotally coupled to the forward end of elongate member 146 by bolt 162 about which second bracket 160 pivots. The operator changes the position of second bracket 160 by pulling quick coupler 172 to the left (in FIG. 6) against the force exerted by coil spring 176. Once quick coupler 172 has been withdrawn, second bracket 160 is disengaged from first bracket 158. Once disengaged, second bracket 160 can be pivoted up or down about bolt 162 to any of a plurality of positions.

Once second bracket 160 has been moved into the proper position, the operator can release quick coupler 172, and the force exerted by coil spring 176 will pull quick coupler 172 into an adjacent hole 174 in second bracket 160 thus raising or lowering point support surface 178 a second bracket 160. Since second bracket 160 has four holes 174, quick coupler 172 can hold second bracket 160 in four different positions. Two of these positions are shown in FIG. 4, in which one position is rendered in phantom lines, and one position is rendered in solid lines. Alternative embodiments of second bracket 160 may include more or fewer holes and more or fewer positions than are illustrated here.

To adjust point support 144, the operator goes to each point/cover pair on corn head 104 in turn. The operator raises each point 108, disengages quick coupler 172, and places second bracket 160 in the same position on each of the point supports 144 (i.e. the quick coupler 172 on each cover 110 engages the same hole 174 on all the second brackets 160) Even though each of the first brackets 158 are adjusted to engage the same hole 174 on each corresponding second bracket 160, the tips of the points 108 may nonetheless be at different heights above the ground due to manufacturing tolerances, misalignments and misadjustments of various components. For this reason, the operator can eliminate these smaller differences in height between the points 108 by going to each point support 144 and adjusting fine adjuster 164 until the tips of each point 108 are the same height above the ground. In previous arrangements, adjusting the height of the points might take an hour or two. For this reason, operators seldom adjusted the height of their points with respect to the header, and instead raised and lowered the header to increase or decrease the height of the points above the ground.

Once the operator has made his initial fine adjustments he can later change the height of all of the points very quickly in the field. The process of later raising or lowering the height of all the points typically takes two or three minutes. The operator lifts up the point 108 from point support surface 178 of second bracket 160, disengages quick coupler 172 with one hand, rotates second bracket 160 into a new position with his other hand, releases quick coupler 172 to reengage and retain second bracket 160 in its new position, and lowers point 108 until it again rests on point support surface 178 of second bracket 160 in a new position.

Having described the preferred embodiment, it will become apparent that various modifications can be made without departing from the scope of the invention as defined in the accompanying claims.

The invention claimed is:

1. A point and cover assembly for a row crop header, comprising:
a point;
a cover coupled to the point with a hinge;
a latch fixed to the cover, the latch further comprising a first spring-loaded latch pin for pinning the cover to a first row unit, a second spring loaded latch pin for pinning the cover to a second row unit, and a member coupling the two latch pins together that is operable by one hand to release both latch pins from the first and second row units; and a point support comprising an elongate member fixed at its rear end to the cover and having an adjustable point rest at its front end for supporting the point at a plurality of different heights.

2. The point and cover assembly of claim 1 wherein the adjustable point rest comprises a quick coupler operable by one hand to adjust the height of the point.

3. The point and cover assembly of claim 2 wherein the quick coupler includes a spring loaded pin operable by one hand of the operator to adjust the height of the point.

4. The point and cover assembly of claim 1, wherein the member extends laterally and the two latch pins extend from either end of the member.

5. The point and cover assembly of claim 4, wherein each of the two latch pins is provided with a coil spring to hold each latch pin in a locked position in which the cover is held down.

6. The point and cover assembly of claim 1 wherein the two latch pins are configured to engage apertures in two corresponding pin receivers that are fixed to two adjacent row unit control arms.

7. The point and cover assembly of claim 1 further comprising the adjustable point rest mounted on the front of the cover.

8. The point and cover assembly of claim 7 wherein the adjustable point rest further comprises a fine adjuster for adjusting the position of a first bracket with respect to the elongate member and a spring pin configured to adjust the position of a second bracket with respect to the first bracket, and further wherein the second bracket has a point support surface for supporting the front of the point in a plurality of vertical positions.

* * * * *